United States Patent [19]

Ives

[11] 4,269,798

[45] May 26, 1981

[54] METHOD FOR PRODUCING A CURABLE, FILLED RESIN COMPOSITION, E.G., ARTIFICIAL MARBLE

[76] Inventor: Frank E. Ives, 26601 Dover Ct., Kent, Wash. 98031

[21] Appl. No.: 953,798

[22] Filed: Oct. 23, 1978

[51] Int. Cl.³ .................. B29B 1/10; B29B 3/00; B29B 5/00; B29C 9/00
[52] U.S. Cl. .................. 264/73; 260/40 R; 264/245; 264/349; 366/76
[58] Field of Search .................. 260/40 R; 264/75, 73

[56] References Cited

U.S. PATENT DOCUMENTS

| 3,488,246 | 1/1970 | Duggins | 264/75 |
| 3,706,825 | 12/1972 | Hall et al. | 264/75 |
| 3,746,489 | 7/1973 | Rizzi et al. | 425/205 |
| 4,068,831 | 1/1978 | Ebeling et al. | 366/156 |
| 4,159,301 | 6/1979 | Buser et al. | 260/40 R |

Primary Examiner—John C. Bleutge
Assistant Examiner—A. H. Koeckert
Attorney, Agent, or Firm—Christensen, O'Connor, Johnson & Kindness

[57] ABSTRACT

A filler material and a heated, catalyzed synthetic resin are sequentially introduced into a mixer. The mixer has a conveying section and a mixing section. The resin and filler are introduced into the conveying section, which forces the combined resin and filler material into and through the mixing section. The mixing section kneads and shears the material to uniformly disperse the resin throughout the filler. The resin/filler mixture is then dispensed into a mold for curing.

11 Claims, 10 Drawing Figures

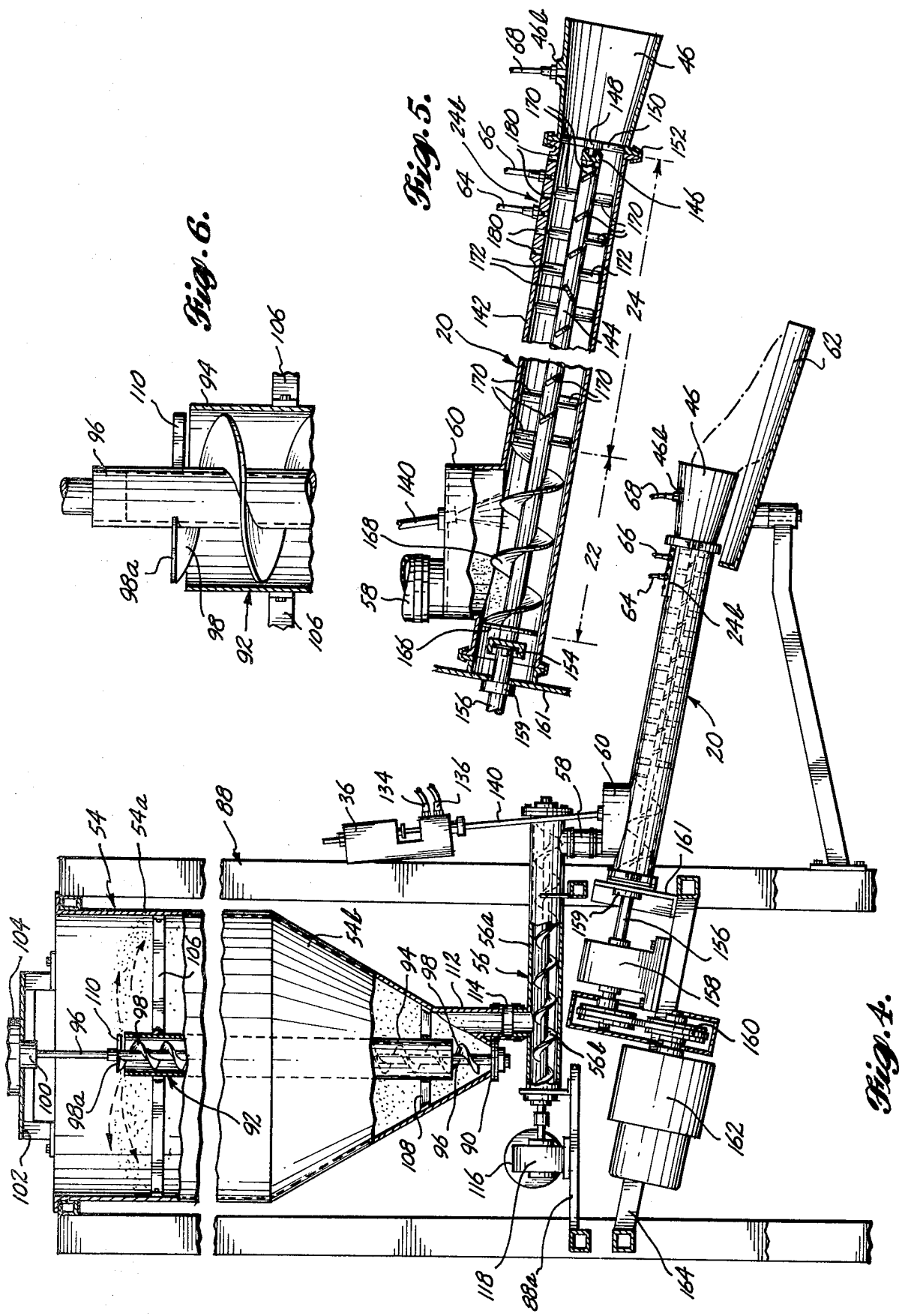

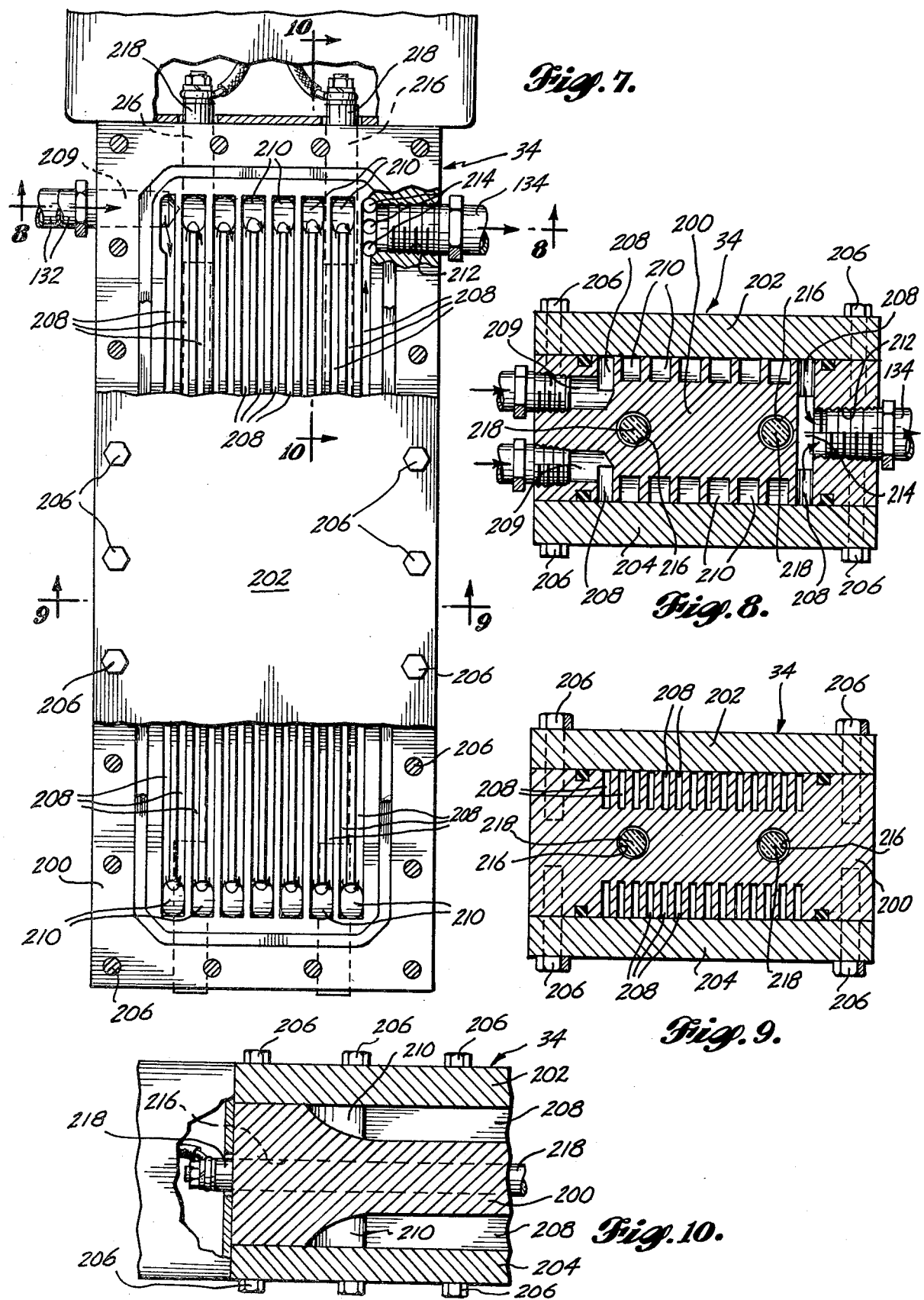

METHOD FOR PRODUCING A CURABLE, FILLED RESIN COMPOSITION, E.G., ARTIFICIAL MARBLE

BACKGROUND OF THE INVENTION

The present invention relates to methods and apparatus for producing a curable, filled resin composition, and more particularly to methods and apparatus for producing such a composition that is used to make synthetic stone, such as synthetic marble or onyx.

Integral sink basin and countertop structures are formed in a mold from a mixture of a curable synthetic resin and a filler. A pigment is added to the mixture prior to placing the mixture in the mold. The pigment is only partially mixed into the resin and filler so that streaks of pigment appear in the final molded object. If the pigment is properly incorporated into the mixture, the pigment streaks give the molded object the appearance of marble or other real stone product. Such mixtures of filler, resin and pigment when cured are commonly referred to as synthetic stone, and if appropriately pigmented are referred to as synthetic marble or onyx. A common filler employed for a mixture that is to be used to produce synthetic marble is calcium carbonate. A common filler employed to produce synthetic onyx is a combination of aluminum trihydrate and glass frit. A common resin employed to produce synthetic stone products is a polyester resin containing a cross-linking monomer. The molded product resulting from a mixture of polyester resin and a filler is an esthetically pleasing, durable substitute for ordinary countertops into which are inserted ceramic or steel sink basins.

Heretofore, the molding compositions comprising resin and filler have been mixed in a batchwise manner to produce a molding mixture. Ordinarily, commercially available bread dough mixers are employed for the batchwise mixing. Normally, uncatalyzed resin is first placed in the mixing container. Catalyst is then added to and thoroughly mixed with the resin. Thereafter, the filler is placed into the mixing container of the dough mixer. The resin and filler are then mixed until the resin is evenly dispersed throughout the filler. Normally, several minutes are required to evenly disperse the resin throughout the filler when using a dough mixer. When the resin is dispersed, a measured amount of pigment is added to the mixture and is partially distributed or streaked through the mixture, leaving distinct portions of the mixture free of pigment. Thereafter, the mixing container is removed to a location where the molding mixture is poured into a mold and allowed to cure.

Normally the resin is catalyzed so that it will begin to cross-link shortly after it is poured into the mold. Consequently, a new batch of resin cannot be mixed in the container used for a previous batch as the residue of the molding mixture in the container will have cross-linked and thus solidified. Before the container can be used again, it, as well as the mixing tool, must be thoroughly cleaned with solvent. Thus the batchwise processes are not labor efficient because the filler and resin must be manually added to the mixing container, because the time required for the resin to be thoroughly mixed throughout the filler is quite long, and because cleaning time is required after each batch is poured into a mold. Moreover, since a substantial amount of time is required to disperse the resin throughout the filler when prior art mixing methods are used, the resin/filler mixture may begin to cross-link prior to the time it is thoroughly mixed and placed in a mold.

Another problem associated with prior art methods of producing synthetic marble arises because the pigments employed are normally solid materials. In order to obtain the desired marbled effect in the molded product, the pigments necessarily must be mixed with a liquid in order to be properly incorporated into the resin/filler mixture. Normally the pigment is dispersed in a saturated resin, that is, one containing no cross-linking sites, because the saturated resin is compatible with the resin/filler mixture and because the saturated resin will not prematurely cross-link and render the resin/pigment mixture unusable. However, when the saturated resin/pigment mixture is incorporated into the resin/filler mixture, the saturated resin many times is insufficiently dispersed into the resin/filler mixture, leaving regions in the molding mixture where the resin will not cross-link and thus creating undesirable soft spots in the final cured product. If attempts are made to better disperse the saturated resin into the resin/filler mixture, the pigments carried by the saturated resin are often too sparsely distributed throughout the resin/filler mixture, thus again not achieving the desired aesthetic effect in the final product.

Accordingly, a broad object of the present invention is to provide methods and apparatus for continuously producing a curable, filled resin composition, usable for example in making molded synthetic marble articles. Another object of the present invention is to provide methods and apparatus for producing a filled resin composition that eliminates the need to handle the resin and filler on a batchwise basis and that essentially eliminates the lengthy mixing time required by prior art processes to thoroughly disperse the resin throughout the filler. A corollary object of the present invention is to provide methods and apparatus for producing a filled resin composition that will uniformly disperse the resin throughout the filler in a very short time. Another object of the present invention is to eliminate the labor requirements of cleaning the mixing equipment after each object is molded as required by the prior art batchwise mixing. It is still a further object of the present invention to provide methods and apparatus in the use of which the pigment can be mixed with a curable resin and thereby eliminate the occurrence of soft spots in a molded object caused by concentrations of saturated resin. Other objects of the present invention are to provide methods and apparatus for continuously producing a filled resin composition that will increase the overall efficiency of production of objects molded from the composition, and that will decrease the cost per molded object produced.

SUMMARY OF THE INVENTION

In accordance with the foregoing objects, and other objects that will become apparent to one of ordinary skill upon reading the following specification, the present invention provides novel methods and apparatus for continuously producing a curable, filled resin composition. In its broadest aspects, the method of the present invention comprises combining a filler material with a liquid curable resin in a conveying zone. The combined resin and filler are forced from the conveying zone under confinement into a mixing zone where the two components are mixed while being conveyed to a mold transfer station. The mixture thus formed is deposited in a mold and allowed to cure in the mold. Preferably, the pigment is combined with a curable resin and is added to the resin/filler mixture in the mixing zone prior to being deposited in the mold. Prior to combining the resin and the filler, the resin is heated to a temperature preferably between about 90° F. and 140° F. to lower its viscosity. The lowered viscosity resin is more easily dispersed throughout the filler in the mixing zone with the consumption of less mixing energy. Moreover, the resultant viscosity reduction increases the resin yield, that is, reduces the required quantity for a given product of the moxt expensive ingredient, the resin. It is most preferred to maintain the resin temperature within about ±2° F. of a temperature selected from the foregoing range so that the viscosity of the resin is maintained substantially constant. By maintaining a substantially constant viscosity, the characteristics of the resin/filler mixture issuing from the mixing zone are consistent and reproducible.

An apparatus for carrying out the foregoing method comprises an auger means having an upstream conveying section and a downstream mixing section, a storage means for storing filler material, a resin supply means for supplying curable resin to the auger means, and a heating means operatively associated with the resin supply means for heating the curable resin. The storage means includes means for selectively conveying material from the storage means to a first inlet in the conveying section of the auger means. The resin is introduced into a second inlet in the auger means, preferably also communicating with the conveying section. The conveying section of the auger means conveys the thus-combined filler and resin under confinement of the auger means housing to the mixing section of the auger means. In the mixing section of the auger means, the two components are subjected to constant shear forces throughout the length and width of the mixing section while being conveyed through the mixing section toward the outlet of the auger means. The completed mixture upon issuing from the auger means is poured into a mold where it is allowed to cross-link and solidify. The apparatus also includes pigment supply means for supplying a pigment mixed with a curable resin to a pigment inlet located in the mixing section of the auger means. Preferably, when producing synthetic marble or similar synthetic stone products, the pigment inlet for the pigment is located near the outlet of the auger means.

In a preferred form of the invention, the auger means comprises an elongated tubular housing and a shaft coaxially mounted for rotation within the tubular housing. The shaft has a helical blade mounted adjacent one end thereof to form, in conjunction with the housing, the conveying section of the auger means. A plurality of axially and circumferentially spaced paddles are mounted on the shaft downstream from the conveying section to form, in conjunction with the housing, the mixing section of the auger. As the shaft and blade are rotated, the filler and resin introduced in the conveying section are forced into the mixing section under pressure and confinement, where the paddles subject the mixture to shear forces. Constant application of the shearing action of the paddles on the mixture quickly and efficiently disperses the resin throughout the filler. Although at least a portion of the paddles are oriented so as to tend to convey the material being mixed toward the outlet of the auger means, the primary driving force through the mixing section is derived from the rotation of the helical blade in the conveying section. A portion of the paddles in the mixing section preferably those in the central portion of the mixing section, are oriented to oppose the flow of material being mixed through the mixing section so that a reversal of the shearing action is obtained at at least one location in the mixing section. It is most preferred that the paddles adjacent the helical blade and adjacent the outlet be oriented to promote flow of the material through the mixing section.

A peripheral aspect of the present invention comprises a means for feeding filler material into the filler storage means. Normally, filler material such as calcium carbonate is packaged in 50 to 100 pound sacks. Prior to the present invention, the sacks were manually opened by ripping the top off the sacks, or removing the closure stitching from the sacks, and thereafter manually lifting and dumping the contents of the sack into the mixing container. In accordance with the present invention, a sack breaker is provided that allows the person emptying the sacks to merely lift the sacks once, drop them across a breaking bar, and lift the empty sack from the breaking bar. The sack breaker has a hopper that has an open top and a blade having an upwardly oriented edge that is affixed to the hopper so as to extend across the central portion of the hopper opening. Preferably, a screen is mounted over the opening and under the blade. Also, preferably, the upper edge of the blade has a sawtooth configuration. When a sack is dropped onto the screen, the sawtooth blade punctures the central portion of the sack. When the ends of the sack are grasped and lifted upwardly, the filler material readily flows from the sacks into the hopper. The hopper is, in accordance with the broader aspects of the invention, coupled to the filler storage means by a conventional auger conveyor.

In another peripheral aspect of the present invention, a novel resin heater is provided. The resin heater is preferably composed of a material that has a high heat tranfer coefficient, such as aluminum. The heater has a body having at least one planar face into which are formed a plurality of parallel slots. Opposite ends of each slot are serially connected in fluid communication with the ends of adjacent slots to form a sinuous resin flow path. An inlet means communicates with one end of the flow path while an outlet means is coupled to the other end of the flow path. A cover plate is secured to the body to form a closed flow path. Heater means, preferably an electric resistance heater, is imbedded in the body to heat the body and thus the resin to a desired temperature. A nonthermostatic, demand-type controller is used to precisely control the temperature of the heater means.

BRIEF DESCRIPTION OF THE DRAWINGS

A better understanding of the present invention can be derived by reading the ensuing specification in conjunction with the accompanying drawings, wherein:

FIG. 4 is a side elevation view of a portion of the apparatus shown in FIGS. 2 and 3 partially broken away and partially in section;

FIG. 5 is an enlarged longitudinal sectional view of the mixing auger of the present invention;

FIG. 6 is an enlarged, longitudinal sectional view of the upper end of the auger located in the filler storage means;

FIG. 7 is a plan view, partially broken away, showing the resin heater of the present invention; and FIGS. 8, 9 and 10 are sectional views of the resin heater taken along section lines 8—8, 9—9 and 10—10 of FIG. 7, respectively.

DETAILED DESCRIPTION

The present invention will be described in relation to a preferred apparatus and method for producing a resin/filler/pigment mixture for the production of synthetic marble, a material that when molded and cured has a surface appearance that closely resembles natural marble, onyx or other natural stone. One of ordinary skill in the art will realize that the method and apparatus do have application to the production of resin/filler mixtures produced for other purpose.

Figure 1:
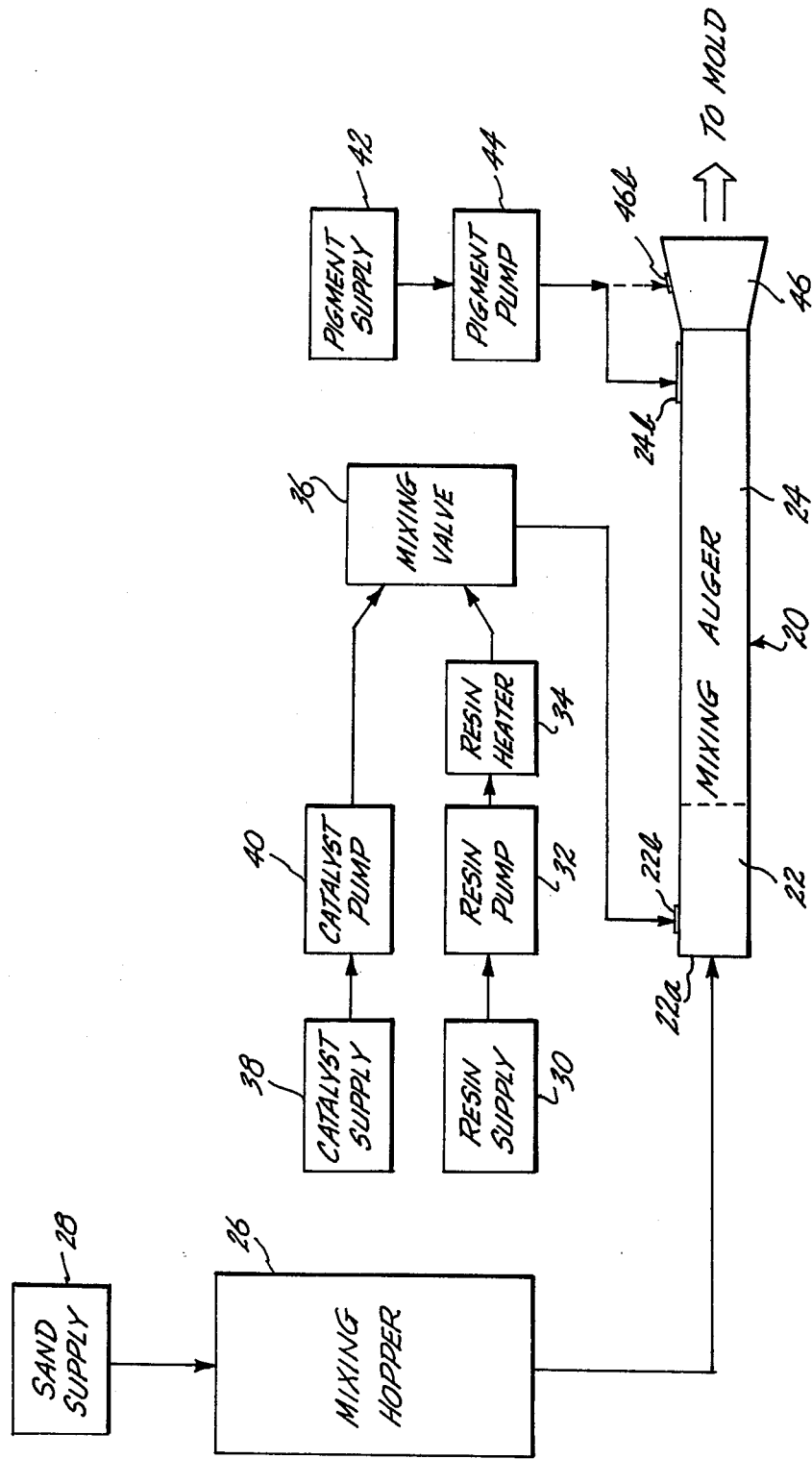
FIG. 1 is a block diagram illustrating the basic components of the apparatus in accordance with the present invention sequentially arranged to illustrate the basic method steps of the present invention.

Referring to FIG. 1, the mixing auger 20 is schematically divided into an upstream conveying section 22 and a downstream mixing section 24. The details of the mixing auger will be described in conjunction with later figures. A filler is supplied to a particle distribution zone 26 from a source 28. The filler normally employed to produce synthetic marble is finely divided mineral aggregate, such as comminuted calcium carbonate, conventionally referred to in the art as sand. The sand normally employed to produce synthetic marble is on the order of between −40 mesh and +200 mesh U.S. standard sieve size. Preferably, the sand is agitated or mixed in the particle distribution zone to uniformly distribute the various particle sizes of sand throughout the entire volume of sand in the distribution zone. From the distribution zone 26, the sand is fed to the inlet end 22a of the conveying section 22 of the mixing auger 20. As soon as the sand enters the inlet end of the mixing section, it is conveyed toward the mixing section 24 of the auger.

A curable synthetic resin is also supplied to the conveying section 22 of the auger through an injection port 22b in the side of the auger adjacent the inlet end 22a. The resin normally employed to produce synthetic marble is a polyester resin containing a cross-linking agent such as a vinyl monomer. Uncatalyzed resin is pumped from a source 30 by a resin pump 32 through a resin heater 34. In the resin heater 34, the resin is heated to a temperature above room temperature and below about 140° F. to reduce the viscosity of the resin. Lowered viscosity of the resin enhances the ability to distribute catalyst throughout the resin and reduces the time required for dispersion of the resin throughout the sand in the mixing section 24 of the auger, as well as increases the resin yield.

It is most preferred that the resin be heated to a temperature in the range of from about 90° F. to about 120° F. Within this temperature range, the polyester resin exhibits a viscosity which is best suited for use with the present invention. If the resin is not heated as high as 90° F., it will be relatively viscous and require extra energy for dispersion throughout the sand. Additionally, if the resin temperature is below 90° F., it may not be completely dispersed throughout the sand before it passes out of the auger mixing section. On the other hand, if the resin is heated to a temperature greater than 120° F., once catalyzed, the resin will tend to begin cross-linking at a rapid rate, sooner than is desired. Moreover, if the temperature of the resin exceeds about 140° F., the resin will be near its flash point, presenting the danger of vaporization and premature gelling, since each incremental increase of 15° F. in resin temperature cuts the gel time in half. It is most preferred that the temperature of the resin leaving the resin heater vary no more than about 2° F. from a predetermined resin temperature, although it has recently been observed that temperature variations on the order of ±5° F. from the norm will not adversely affect the final product. If the resin is allowed to deviate more than 2° F. from the predetermined resin temperature, the viscosity of the resin will vary significantly, consequently varying the matrix viscosity (the viscosity of the resin/filler mixture) in the mixing auger and thus causing undesirable changes in the handling requirements of the mixture, as well as undesirably altering the marbleizing effect. For example, if the resin temperature is allowed to vary, compensating quantities of resin must be used, making it difficult if not impossible to precisely control the process. Moreover, when the uniformity of the end mixture varies significantly, reproducibility of appearance for a synthetic stone product is difficult to achieve.

After the resin traverses through the resin heater 34, it is routed to a mixing head 36 where it is mixed with an appropriate amount of a conventional catalyst. The catalyst is pumped to the mixing head 36 from a catalyst supply 38 by a catalyst pump 40. From the mixing head 36, the catalyzed resin is fed to the resin injection port 22b on the conveying section 22 of the mixing auger.

Preferably, for a synthetic marble product, the resin is combined with the sand in amounts ranging from about 18% to about 25% by weight of resin based on the total weight of the sand and catalyzed resin present in the mixture. Best results are obtained for a resin/sand mixture that will lie near the surface of a mold if the resin content in the mixture is maintained at about 21% by weight. However, when filling a mold with material that will be separated by more than an inch or so from the mold surface, it is desirable to decrease the resin content to about 18% by weight, thus saving expensive resin and lowering the overall cost of the molded article. When the process of the present invention is employed to make synthetic onyx using an aluminum trihydrate and glass frit filler, the resin content must be increased on the order of 10%, that is, up to about 35% by weight, to assure the product will be sufficiently transparent to emulate natural onyx.

From the conveying section 22 of the mixing auger 20, the combined sand and resin, not yet thoroughly mixed, are conveyed under pressure and the confinement of the auger housing to the mixing section 24 of the auger. Details of the mixing apparatus and procedure will be described more completely below. The resin/sand mixture is forced through the mixing section of the auger primarily by the advancing pressure created by material issuing from the conveying section 22 of the auger.

Pigment is incorporated into the mixture at the downstream end of the mixing section 24 of the auger 20. Pigment is pumped from a source 42 via a suitable pump 44 and is injected into the auger through a pigment injection port 24b adjacent the outlet end of the mixing section 24. A pouring spout or bell 46 is attached to the outlet end of the mixing auger. From the pouring spout, the resin/sand mixture is introduced into a suitable mold and allowed to cure. If desired, pigment can also be introduced through a second pigment injection port 46b on the pouring spout 46. Although the schematic illustration of FIG. 1 only shows two pigment injection ports, it is to be understood that one, two or more pigments can be added to the resin/sand mixture according to the methods and apparatus of the present invention either simultaneously or alternatively. It is most desirable that the pigment be introduced into the resin/sand mixture near the end of the mixing zone to prevent the pigment from being evenly and thoroughly dispersed throughout the resin/sand mixture. If the pigment were dispersed evenly, the desired result of a final product having a marbleized appearance would be lost as only a continuous tone product would be produced. Therefore, it is preferred that the pigment be only partially distributed throughout the resin mixture, thus forming stripes or streaks in the final mixture. Then, when the mixture containing the pigment stripes or streaks cures against the mold surface, the stripes or streaks will appear as markings similar to those appearing in natural marble.

Figure 2:
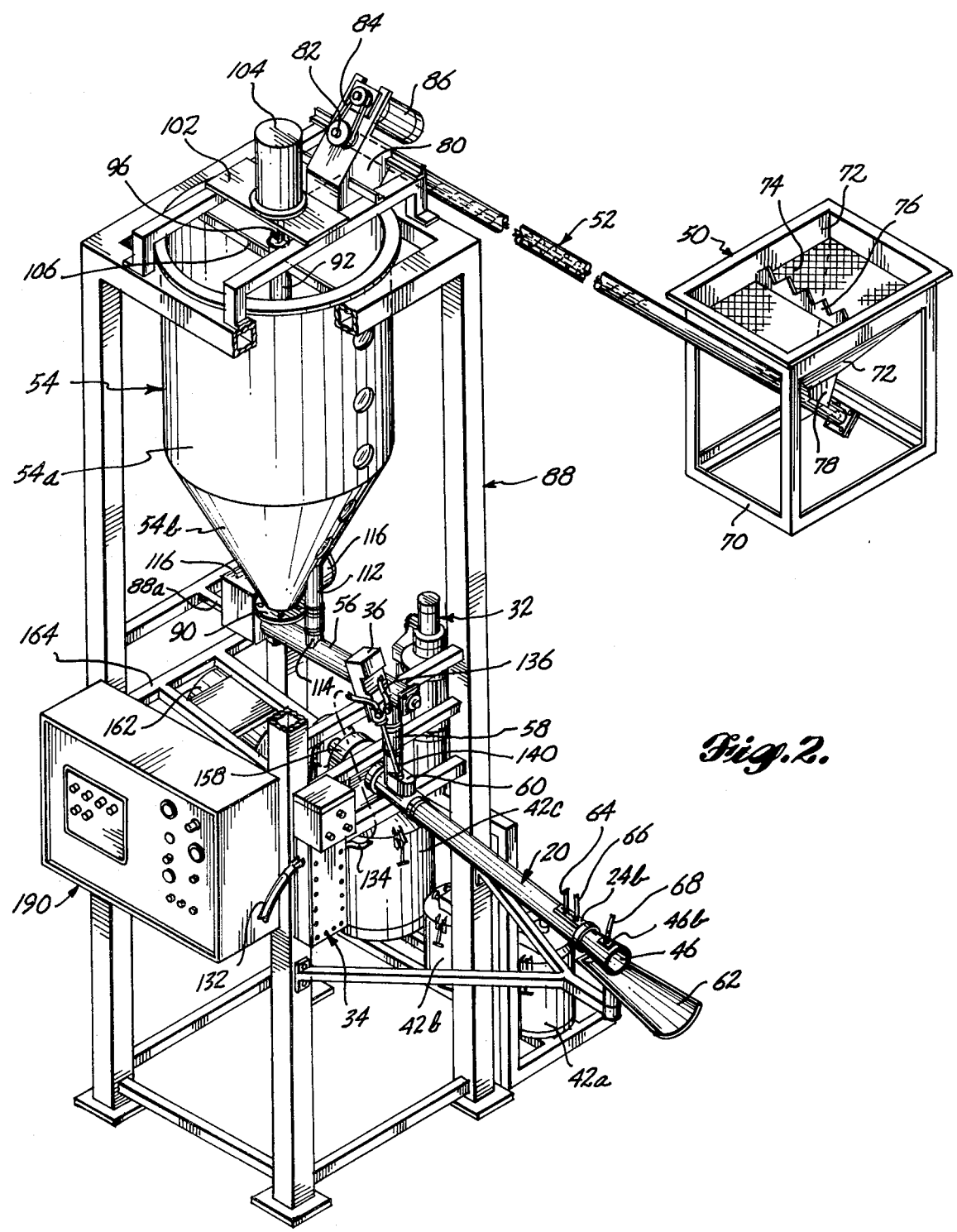
FIG. 2 is an isometric front view of the apparatus of the present invention.
Figure 3:
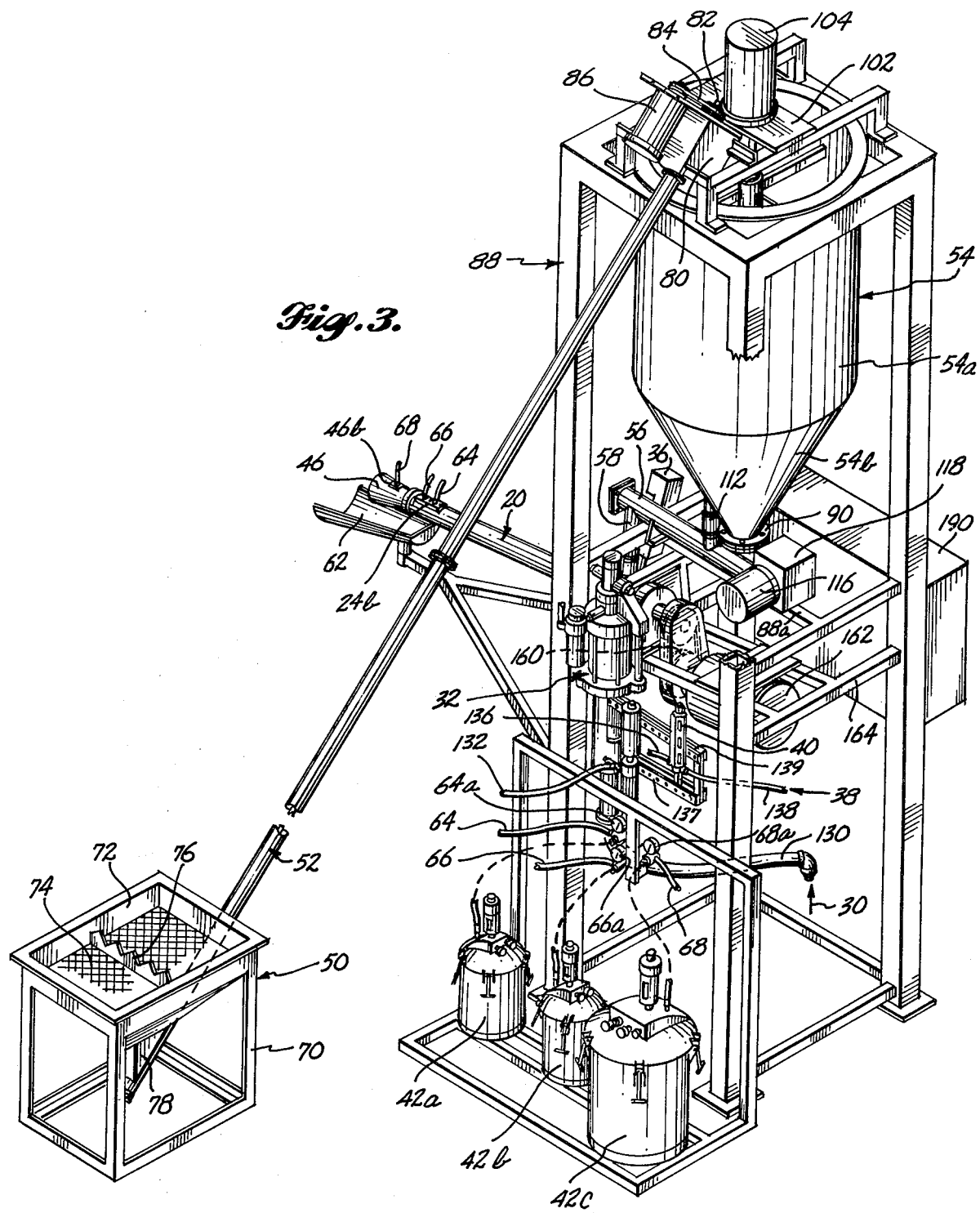
FIG. 3 is an isometric rear view of the apparatus of the present invention taken from the side of the apparatus opposite to that shown in FIG. 2.

Referring now to FIGS. 2 and 3, a preferred apparatus for producing a filled, curable resin molding composition usable for making synthetic marble, onyx and like synthetic stone materials is illustrated. Sand is dumped into the hopper of a sack breaker 50 which opens into an elevating auger 52. The elevating auger 52 carries the sand from the sack breaker 50 into the sand storage and mixing hopper 54. The sand is continuously mixed and agitated in the mixing hopper 54 to uniformly distribute the different size particles throughout the entire volume of sand in the hopper. A small transfer conduit 112 extends from the bottom of the mixing hopper 54 and opens into a horizontal transfer auger 56. The transfer auger 56 terminates in a second riser 58 communicating with the conveying section of the mixing auger 20. The resin is pumped from a source 30 (not shown in FIGS. 2 and 3, but indicated by an arrow) by a resin pump 32 to the resin heater 34 from whence it travels to the catalyst/resin mixing head 36. From the mixing head 36, the resin flows into an injection header 60 downstream from the second riser 58 on the conveying section of the mixing auger 20. The sand and catalyzed resin mixture are mixed in the mixing section of the auger and issue from the pouring spout 46 on the end of the auger into a trough 62. From the trough 62, the molding composition is allowed to flow into a mold (not shown). Pigment is supplied to the pigment injection ports 24b and 46b via conduits 64, 66 and 68 coupled to pigment supply tanks 42a, 42b and 42c. In the preferred embodiment of the present invention, no pump is utilized for transferring the pigment from the pigment supply tanks 42a, 42b and 42c to the mixing auger. Instead, the pigment supply tanks are pressurized with fluid pressure, preferably air pressure, so that only valves 64a, 66a and 68a interposed in the conduits 64, 66 and 68 need be opened to inject pigment into the downstream end of the mixing section of the auger 20.

Referring back to the sack breaker 50, a frame 70 rests on the floor and supports a hopper 72, the upper end of which is open. A screen 74 is affixed to the hopper and is positioned below the upper edge of the opening. The screen 74 will support a sack of sand resting on it. A sack splitting bar 76 is positioned across the central portion of the hopper opening above the screen 74. The upper edge of the splitting bar 76 has a sawtooth configuration. When a sack is dropped into the hopper opening, the sawteeth of the splitting bar 76 will impale the sack and split it open substantially along the central portion of the sack. As the sack ends are lifted after the sack is split, all of the sand in the sack will empty from the sack and fall through the screen into the hopper 72. Almost no effort is required to lift the sack ends as the sack is split sufficiently by the splitting bar 76 so that its contents are already partially emptied when the sack is lifted. A downwardly extending chute 78 couples the hopper 72 with the bottom end of the elevating auger 52. The elevating auger 52 is of standard construction, is closed at its bottom end, and terminates at its upper end in a second chute 80, which extends downwardly toward the storage hopper 54 to channel sand from the elevating auger 52 into the storage hopper 54. The auger shaft 82 is driven by a belt and pulley drive train 84, in turn driven by a suitable electric motor 86.

The sand storage hopper 54 is conventionally affixed to and supported by the upper end of a main frame, generally designated 88. The main frame 88 supports the remaining portion of the apparatus with the exception of the resin, catalyst and pigment supply containers. The sand storage hopper 54 has an upper cylindrical portion 54a joined to a lower frustoconical portion 54b. The lower frustoconical portion 54b converges downwardly and terminates in an auger support bearing 90.

Referring now to the elevation view of FIG. 4, a sand particle distributing auger 92 is centrally located in the sand storage hopper 54. The particle distributing auger 92 is required for three reasons. First, the sand dumped into the storage hopper has particles varying over a quite wide range. If the sand were not mixed continuously, the fine and heavier particles would separate, thus not providing uniform particle distribution in the filler mix. The auger 92 continuously circulates the sand so as to prevent particle separation. Secondly, as the distributing auger 92 operates, the sand circulates downwardly toward the lower portion of the bottom section 54b of the hopper and into the bottom of the distributing auger. As the sand approaches the bottom of the distributing auger, it can freely flow through the transfer conduit 112 into the transfer auger 56. Thus, the auger prevents the sand from packing into the bottom of the hopper and thus not flowing by gravity through the transfer conduit 112 into the transfer auger 56. Thirdly, when a filler such as aluminum trihydrate and glass frit is used to make synthetic onyx, it is necessary to thoroughly mix the two components as they are normally separately introduced into the hopper 54.

The distributing auger 92 has an outer tubular housing 94 and an auger shaft 96 to which is affixed a conventional helical auger blade 98. The sand distributing auger 92 is vertically oriented and located concentrically within the storage hopper 54. The bottom end of the shaft 96 and the auger blade 98 extend below the lower opening of the tubular housing 94. The bottom end of the shaft 96 is supported in the auger bearing 90 at the bottom end of the lower portion of the sand hopper. The upper end of the auger shaft 96 extends beyond the upper opening of the tubular housing 94 and through a suitable opening in the top of the storage hopper. The upper end of the shaft 96 is journaled in a bearing 100 affixed to a drive motor support subframe 102, in turn affixed to the main frame 88. The upper end of the shaft is coupled to a suitable electric drive motor 104 also mounted on the motor support subframe 102.

Spiders 106 and 108 support the auger housing in its central location in the storage hopper 54. The bottom of the auger housing 94 is spaced sufficiently far away from the bottom of the lower section 54b of the hopper 54 so that the bottom portion of the auger blade 98 extending below the auger housing will have a good bite on the sand at the bottom of the hopper. As the auger shaft 96 is rotated, the auger blade 98 draws sand up through the auger housing and ejects the material out the upper opening of the auger housing. Referring to FIGS. 4 and 6, a small key or bar having a length about equal to the radial width of the auger blade 98 is positioned in spaced relationship above the auger housing. The bar 110 is oriented radially to and affixed to the shaft 96. Preferably, both the upper, radial terminating edge 98a of the blade 98 and the bar 110 are spaced the same distance above the outlet from the housing 94. As the sand is ejected from the top of the auger housing 94 by the auger blade 98, the bar 110 contacts the sand and throws or flings it radially outwardly toward the wall of the hopper. In this manner, the sand ejected from the distributing auger is evenly spread from a location adjacent the auger housing outwardly toward the hopper wall. It has been found that for a hopper diameter of 30 inches and an auger housing inside diameter of 3 inches, a rotational speed for the auger that is effective to intermix and uniformly distribute the different size sand particles in the hopper is about 1800 rpm.

Referring again to FIG. 4, sand flows from the storage hopper 54 to the transfer auger 56 via transfer conduit 112. The lower end of conduit 112 is coupled to a tubular inlet 114 extends radially upwardly from the upstream side of the tubular housing 56a of the transfer auger 56. The outlet from the side of the frustoconical portion 54b of the storage hopper to the conduit 112 is oval in shape and is spaced slightly above the bottommost portion of the frustoconical section 54b of the hopper. The outlet is adjacent the lower end of the sand distributing auger 92 so that rotation of the auger blade 98 will cause material to flow not only into the auger housing 94 but also will lift material and agitate it sufficiently so that it will flow readily and easily down the conduit 112 into the transfer auger 56.

Transfer auger 56 is of conventional construction and includes an auger shaft and helical blade 56b and the tubular housing 56a. The transfer auger 56 is driven by a suitable electric motor 116 and suitable gear box 118 mounted on a suitable support subframe 88a. The motor 116 is a variable speed motor that can be selectively controlled to vary the speed of the transfer auger and thus the rate at which sand is transferred by the transfer auger. The transfer auger 56 moves the material from the conduit 112 and deposits it in the second transfer conduit riser 58 that extends radially downwardly from the bottom downstream end of the transfer auger housing 56a. The bottom end of the second transfer conduit 58 terminates in an inlet in the injection header 60 on the mixing auger 20 situated adjacent the upstream end of the converging section of the mixing auger.

Referring now to FIGS. 2, 3 and 4, uncatalyzed resin is pumped from a source 30 (indicated by the arrow in FIGS. 2 and 3) by the resin pump 32 to the resin heater 34. The resin pump is preferably a variable speed, pneumatically powered, positive displacement pump. Such resin pumps are of conventional design and are commercially available under the trademark "H.I.S." from Venus Products of Kent, Washington. A flexible hose 130 places the inlet side of the pump 32 in communication with the source 30 of uncatalyzed resin. From the outlet side of the pump 32, the resin is pumped via conduit 132 to the resin heater 34. From the resin heater 34, which will be described in greater detail below, the resin is pumped via conduit 134 to the mixing head 36. The mixing head 36 is also of conventional design and is commercially available from Venus Products of Kent, Washington. Catalyst is supplied via conduit 136 to the mixing head 36 from a catalyst pump 40. The catalyst pump is mounted on a support arm 137 rigidly affixed to the resin pump 32. The catalyst is supplied to the pump 40 from a source (indicated by arrow 38 in FIG. 3) via a conduit 138. The catalyst pump is also preferably a reciprocating, positive displacement pump that is driven via a slave arm 139 coupled to the piston rod of the positive displacement resin pump 32. The slave arm 139 is pivotally coupled to a link extending upwardly from the support arm 137 and to the reciprocating unit of the catalyst pump. As the piston rod of the resin pump reciprocates, the slave arm moves up and down to actuate the catalyst pump. The catalyst pump is also of a type that is commercially available from Venus Products. The catalyst pump 40 pumps the catalyst via the conduit 136 to the mixing head 36. Once the catalyst and uncatalyzed resin are mixed in the mixing head 36, they are transferred to the injection header 60 via conduit 140. Referring to FIGS. 4 and 5, both the sand inlet and the resin transfer conduit 140 open into the injection header 60. The bottom of the header 60 in turn opens into the conveying section 22 of the mixing auger 20.

The mixing auger shaft 144 is mounted coaxially for rotation in a tubular housing 142. The downstream end of the shaft 144 is connected by a quick disconnect coupling 146 to a stub shaft 148 suitably journalled in a spider 150. The spider is affixed to the upstream end of the pouring spout 46, which is in turn connected by a sleeve 152 to the downstream end of the tubular auger housing 142. The upstream end of the shaft 144 is coupled by a second quick disconnect coupling 154 to a drive shaft 156 extending from a gear box 158. The drive shaft is journaled in a bearing 159 mounted on a bearing plate 161, in turn affixed to subframe 164. The gear box 158 is driven through a belt and pulley drive train 160 by a suitable electric motor 162. Both the motor 162 and the gear box 158 are mounted on the support subframe 164, in turn affixed to the main frame 88 of the apparatus.

A circular plate 166 having a diameter slightly less than the internal diameter of the tubular housing 154 is mounted on the shaft 144 immediately upstream of the outlet from the injection header 60. A conventional helical auger blade 168, affixed to the auger shaft 144, extends downstream from the circular plate, and past the downstream end of the outlet from the injection header 60 to form the conveying section of the mixing auger 20. As sand and resin flow into the injection header 60, both components are forward to the mixing section of the mixing auger via the rotating helical auger blade 168. Only a small amount of mixing takes place in the conveying section 22. However, the conveying section does perform an important function, which is to create a continuous flow of resin and sand under pressure and confinement into and through the mixing section 24 of the mixing auger 20.

The mixing section 24 of the mixing auger 20 is formed by the tubular housing 142 and a plurality of paddles 170 and 172. The paddles 170 and 172 are mounted on the auger shaft 144 and extend radially outwardly from the shaft so that the ends of the paddles are located adjacent the inner surface of the tubular housing 142. The paddles 170 adjacent the upstream end of the mixing section and adjacent the downstream end of the mixing section are angled relative to a plane orthogonal to the axis of the shaft 144 so that they promote flow of the sand and resin through the mixing section 24 as the auger shaft is rotated. The paddles 172 in the central portion of the mixing section are oriented oppositely to the paddles 170 so as to oppose flow of the resin and sand through the mixing section. The paddles 170 and 172 are mounted on the shaft 144 in sets of two paddles, each oriented 180° to each other relative to the shaft. Adjacent sets of paddles are oriented 90° to each other. The paddles function to apply shearing forces to the sand and resin being forced through the mixing section by the conveying section 22. Because the resin and sand are confined by the auger housing, the paddles quickly knead and efficiently apply shearing forces to the resin and sand mixture so that by the time the sand/resin mixture reaches the downstream end of the auger housing 142, the resin is uniformly dispersed throughout the sand.

In accordance with the present invention, a preferred mixing auger has an inside diameter of 3 inches and a length of 36 inches. The conveying section has a length of 12 inches and the mixing section has a length of 24 inches. Five sets of paddles 170 are employed in the upstream end of the mixing section 24, two sets of paddles 172 are employed in the central portion of the mixing section and six sets of paddles 170 are employed in the downstream end of the mixing section 24. When the drive shaft 156 drives the mixing shaft 144 at a speed of approximately 350 rpm and when 9 lb/min. of sand and 3 lb/min. of resin are being supplied to the injection header 60, the residence time of the sand and resin, from the time it enters the conveying section 22 from the injection header to the time it leaves the downstream end of the mixing auger 20, is approximately 1 minute. Thus it can be seen that the resin/sand mixture is thoroughly mixed and transferred out of the mixing section in a very short time compared to the mixing times required by prior art methods.

In addition to the paddle configuration shown in the drawings, it has recently been found that a plurality of paddles arranged in a helical configuration around the shaft may function better to wipe the inner surface of the auger housing and thus prevent buildup of resin/sand mixture on the housing. In a helical configuration, the paddles are serially located about 90° offset about the shaft from the next adjacent paddle. The paddles are preferably axially arranged so that there is little or no space on the housing that is left unwiped by the paddle tips. As in the paddle configuration shown, it is preferred that some of the paddles in the central portion of the mixing section be reversed in orientation to provide better mixing. Also, paddles on the auger shaft, whether the one shown or the alternative just described, can have a variety of shapes, for example, the rectangular cross section shown, a square cross section, or a circular cross section.

The interior surface of the auger housing 142 and the surface of the auger shaft 144, the auger blade 168 and the auger paddles 170 and 172 are preferably coated with a baked ceramic coating. The hard surface thus provided resists abrasion from the sand and thus prevents metallic particles that would otherwise be abraded from the housing, shaft, blade and paddles from contaminating the resin/sand mixture.

The pigment is introduced at the downstream end of the mixing section 24 at the location of the pigment injection header 24b and/or the pigment injection port 46b. As is best seen by reference to FIG. 5, the pigment injection header 24b has a plurality of ports or passages 180 spaced longitudinally relative to the mixing auger along the downstream end of the mixing section 24. Pigment supply conduits 64 and 66 are coupled to two of the ports 24b on the header. The remaining ports are plugged so as to prevent escape of resin/sand mixture when they are not in use. The plurality of ports 180 allow the pigment to be injected into the resin/sand mixture at various locations, thus providing flexibility in the degree to which the pigment is mixed with the resin/sand mixture. For example, when the pigment is injected through the upstream-most port 180, the pigment is thoroughly mixed into the resin/sand mixture, thus creating a subtantially uniform coloration. However, when the pigment is injected in the downstream-most port 180, much less mixing occurs, thus providing in the end molded product a color streaking that is visually separated from the remainder of the resin/sand mixture. When producing the resin/sand mixture for making artificial marble, it is preferable that the pigment be only partially mixed into the resin/sand mixture, thus providing the desired streaking at the surface of the molded object to simulate the appearance of natural marble. By injecting the pigment into the ports intermediate the downstream and upstream ports 180, variations in the degree of mixing of the pigment into the resin/sand mixture are readily accomplished. It is also possible in accordance with the present invention to inject pigment through the pigment injection port 46b on the pouring spout 46. By injecting the pigment through this injection port, very little mixing of the pigment with the resin/sand mixture occurs, thus providing very distinct separations between the pigmented portions of the mixture and the nonpigmented portions.

Referring back to FIG. 2, a control panel 190 is provided to control the various motors and pumps on the apparatus and thus control either simultaneously or independently the overall operation of the various portions of the apparatus. For example, switches and appropriate wiring are provided for controlling the speed of the various motors 86, 104, 116 and 162 as well as controlling the pressurized air supplied to the resin injection pump 32. All of the controls for the various functions can be grouped on the control panel 190. Preferably, start/stop switches (not shown) for the resin pump 32, transfer auger 56, and mixing auger 20 are mounted in a portable box coupled to the control panel by an umbilical so that these critical components can be controlled by an operator standing at the outlet end of the mixing auger. The circuitry, wiring and pneumatic plumbing have been omitted from FIGS. 2 and 3 for clarity and from the description for brevity. It is well within the capability of one of ordinary skill in the art to provide the appropriate circuitry and plumbing for control of the various functions of the apparatus.

Additionally, controls and wiring are provided for controlling the heater elements in the resin heater 34. As mentioned, it is very important in accordance with the invention to control the resin temperature within ±2° F. of a preselected temperature within the ranges set forth above. It has been found that a conventional percentage timer controller is effective to control the heat input to the electric heating elements in the heater 34 so that the temperature of the resin leaving the heater is precisely controlled. Thermostatic temperature controllers have been found inadequate because they allow too wide of a temperature variation in the resin. Such percentage timer controllers are commercially available under the tradename Chromalux from Edwin L. Wiegand Company, through various distributors in major cities throughout the United States.

Referring now to FIGS. 7 and 10, the resin heater 34 is of the labyrinth type. The heater 34 is machined from aluminum or other suitable material and includes a core 200 and side plates 202 and 204. The sides plates 202 and 204 are fastened to the core 200 by suitable fasteners 206. The core is rectangular in configuration and has a plurality of parallel slots 208 running along opposite, planar faces thereof. Opposite ends of each slot are in fluid communication with adjacent slots by appropriate passages 210 so that the resin flow will follow one of the slots 208 from one end of the core to the other end, then follow the next adjacent slot from that end back toward the first end and so on. Thus the resin follows a sinuous path back and forth along the parallel slots 208 from the injection ports 210 to the outlet port 212. The two inlet ports 210 connect to the first of the parallel slots 208 on opposite sides of the core 200.

The two inlet ports are placed in fluid communication with the inlet conduits 132 by suitable threaded couplings. The inlet conduits are transformed to a single conduit by a suitable Y-coupling (not shown). The last slots 208 on opposite sides of the core 200 are coupled by common outlet 214 to the outlet port 212. The outlet port 212 is coupled to the outlet conduit 134 by a suitable threaded coupling.

Two longitudinal bores 216 run from one end of the core 200 through the opposite end of the core and are sized to receive conventional heating rods 218. Heating rods 218 are inserted in the bores 216 and are conventionally fastened to the core. The heating rods 218 are conventional resistance heating elements supplied with power from the aforementioned controller. By using the resin heater just described and the aforementioned controller, the resin can be pumped into the heater at room temperature and can be heated to the preferred operating temperature within the range of 90° F. to 120° F., while maintaining the actual output temperature within ±2° F. of the desired output temperature.

The present invention has been described in relation to a preferred embodiment and variations thereof. One of ordinary skill after reading the foregoing specification will be able to make various changes, substitutions of equivalents, and other alterations to the methods and apparatus disclosed without departing from the broad concepts imparted. Accordingly, it is intended that the protection afforded by Letters Patent granted hereon be limited only by the definition contained in the appended claims and equivalents thereof.

The embodiments of the invention in which an exclusive property or privilege is claimed are defined as follows:

1. A method for producing a curable filled resin composition comprising the steps of:
   feeding a dry, resin free, granular filler material to a first location in a tubular conveying zone,
   separately feeding a curable, thermosetting filler free, polyester resin to a second location in said conveying zone downstream from said first location, said resin being at a temperature above room temperature and below 140° F. when it is fed to the conveying zone,
   conveying said filler material and said resin under confinement through said conveying zone to a confined mixing zone, said mixing zone being tubular and being an axial extension of said tubular conveying zone, said filler material and said resin being subjected to pressure in said conveying zone so as to force the resin and filler material into and through said mixing zone, and mechanically mixing said filler material and said resin by subjecting the filler material and resin to shear forces both in circumferential and axial directions relative to said tubular mixing zone, thereby to form an uncured filled resin composition,
   transferring said composition to a mold immediately after it exits from the confinement of said mixing zone without further mixing, and
   allowing said composition to cure.

2. The method of claim 1 further comprising: adding pigment to said composition in said mixing zone.

3. The method of claim 2 wherein said pigment is mixed with a curable resin before being added to said composition.

4. The method of claim 1 wherein said resin is heated to a predetermined temperature above room temperature and below about 140° F. immediately prior to being fed to said conveying zone.

5. The method of claim 4 wherein said polyester resin is heated to a temperature in the range of from about 90° F. to about 120° F. immediately prior to introducing said resin into said conveying zone.

6. The method of claims 4 or 5 wherein the temperature of said resin being fed into said conveying zone is maintained within less than about 2° F. of said predetermined temperature.

7. The method of claims 4 or 5 wherein said resin being fed into said conveying zone is maintained within less than about 5° F. of said predetermined temperature.

8. The method of claim 1 wherein said mixture is employed to produce artificial marble, wherein said filler material comprises a finely divided mineral aggregate, and wherein said resin is combined with said aggregate in an amount ranging from about 18 weight percent to about 25 weight percent, the weight percentages being based on the combined resin and aggregate.

9. The method of claim 7 wherein said aggregate comprises calcium carbonate and wherein said resin comprises a polyester resin containing a cross-linking monomer.

10. The method of claim 1 wherein said mixture is used to produce synthetic onyx, wherein said filler material comprises aluminum trihydrate and glass frit, and wherein said resin is combined with said filler material in an amount ranging up to about 35 weight percent, the percentage being based on the mixture of resin and filler material.

11. The method of claim 1 wherein said resin and said filler material pass though said mixing zone together and have a concurrent residence time from the time they enter said conveying zone to the time they leave said mixing zone of less than about 1 minute.

* * * * *